(12) United States Patent
Trossen

(10) Patent No.: US 11,388,018 B2
(45) Date of Patent: *Jul. 12, 2022

(54) ANCHORING INTERNET PROTOCOL MULTICAST SERVICES IN INFORMATION CENTRIC NETWORKS

(71) Applicant: IDAC Holdings, Inc., Wilmington, DE (US)

(72) Inventor: Dirk Trossen, London (GB)

(73) Assignee: IDAC HOLDINGS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/806,670

(22) Filed: Mar. 2, 2020

(65) Prior Publication Data
US 2020/0204387 A1     Jun. 25, 2020

Related U.S. Application Data

(63) Continuation of application No. 15/780,433, filed as application No. PCT/US2016/065782 on Dec. 9, 2016, now Pat. No. 10,581,626.
(Continued)

(51) Int. Cl.
*H04L 12/18*     (2006.01)
*H04L 45/745*     (2022.01)
(Continued)

(52) U.S. Cl.
CPC ........ *H04L 12/1859* (2013.01); *H04L 12/185* (2013.01); *H04L 12/1836* (2013.01);
(Continued)

(58) Field of Classification Search
CPC ............... H04L 12/185; H04L 12/1836; H04L 12/1859; H04L 12/1886; H04L 45/745;
(Continued)

(56) References Cited

U.S. PATENT DOCUMENTS 6,853,639 B1*   2/2005   Watanuki ............. H04L 12/185
                                                                              370/390
7,424,007 B2    9/2008   Meier et al.
(Continued)

FOREIGN PATENT DOCUMENTS

CN        102523165 A     6/2012
CN        103916253 A     7/2014
(Continued)

OTHER PUBLICATIONS

Savola, "Overview of the Internet Multicast Routing Architecture," Network Working Group, RFC 5110 (Jan. 2008).
(Continued)

*Primary Examiner* — Harun Chowdhury
(74) *Attorney, Agent, or Firm* — Volpe Koenig

(57) ABSTRACT

Some embodiments include systems, methods, and devices for enabling communication between at least two internet protocol (IP)-only wireless transmit/receive units (WTRUs), at least one of which is connected to an information centric network (ICN). The WTRU may send a generic attribute registration multicast registration protocol (GMRP) request on a local IP link to an information centric network (ICN) network attachment point (NAP). The NAP may receive and register the GMRP request with an internal data-base (DB) along with an IP multicast address entry matching the GMRP request. The WTRU may then send an IP multicast packet to the NAP for dissemination to an IP multicast group over an ICN by encapsulating the IP multicast packet in an ICN packet.

12 Claims, 12 Drawing Sheets

Related U.S. Application Data

(60) Provisional application No. 62/265,178, filed on Dec. 9, 2015.

(51) Int. Cl.
*H04L 61/45* (2022.01)
*H04W 4/08* (2009.01)

(52) U.S. Cl.
CPC ........ *H04L 45/745* (2013.01); *H04L 61/1547* (2013.01); *H04W 4/08* (2013.01); *H04L 2212/00* (2013.01)

(58) Field of Classification Search
CPC ............. H04L 61/1547; H04L 65/4076; H04L 12/437; H04W 4/08
USPC ........................................ 370/312, 322, 390
See application file for complete search history.

(56) References Cited

U.S. PATENT DOCUMENTS

| | | | |
|---|---|---|---|
| 7,724,745 | B1 | 5/2010 | Elangovan et al. |
| 8,694,675 | B2 | 4/2014 | Wang et al. |
| 8,804,591 | B2 | 8/2014 | Lu et al. |
| 9,049,251 | B2 | 6/2015 | Ravindran et al. |
| 10,194,414 | B2 | 1/2019 | Liu et al. |
| 2008/0205396 | A1* | 8/2008 | Dakshinamoorthy ...................... H04L 12/1886 370/390 |
| 2011/0249551 | A1* | 10/2011 | Rollins ................. H04L 12/437 370/222 |
| 2013/0332619 | A1 | 12/2013 | Xie et al. |
| 2015/0030023 | A1 | 1/2015 | Gupta et al. |
| 2015/0149297 | A1 | 5/2015 | Mahadevan et al. |
| 2015/0312381 | A1 | 10/2015 | Savolainen et al. |
| 2016/0191257 | A1 | 6/2016 | Garcia-Luna-Aceves |
| 2017/0187674 | A1* | 6/2017 | Lee ..................... H04L 65/4076 |
| 2017/0237660 | A1 | 8/2017 | Trossen et al. |

FOREIGN PATENT DOCUMENTS

| | | |
|---|---|---|
| EP | 0 951 198 | 10/1999 |
| WO | 2015/009651 | 1/2015 |

OTHER PUBLICATIONS

Asaeda, "Potential and Challenges of Information-Centric Networking," Journal of the National Institute of Information and Communications Technology, vol. 62, No. 2, p. 119-123 (2015).

Jacobson et al., "Networking Named Content," CoNEXT Proceedings of the 5th Internet Conference on Emerging Networking Experiments and Technologies, Rome, Italy, pp. 1-12 (2009).

Jokela et al., "LIPSIN: Line Speed Publish/Subscribe Inter-Networking," ACM SIGCOMM Computer Communication Review, vol. 39, No. 4, pp. 195-206 (Aug. 2009).

Trossen et al., "Designing and Realizing an Information-centric Internet," IEEE Communications Magazine, vol. 50, No. 7 (Jul. 2012).

Trossen et al., "IP Over ICN—the Better IP? An Unusual Take on Information-centric Networking," pp. 1-5 (Jun. 15, 2015) available at https://www.semanticscholar.org/paper/IP-Over-ICN-The-Better-IP%3F-An-Unusual-Take-on-Trossen-Reed/445c59aed51ad425d2c1a005e215c56f7a22fafd (last visited Jun. 22, 2018).

Xylomenos, "Abstracting IP over ICN," I-CAN Workshop, Athens University of Economics and Business (Jun. 2, 2015).

Krozier, "ICN: Next Boom after SND," Communications World, No. 6 (Mar. 5, 2015).

Li, "ICN System Structure and Technology Research," Netinfo Security, No. 4 (Apr. 30, 2012).

Ma, "Quality of Service Based on IP Multicasting Protocol," Journal of JINAN University (Sci. & Tech., No. 4 (Oct. 25, 2014).

\* cited by examiner

ANCHORING INTERNET PROTOCOL MULTICAST SERVICES IN INFORMATION CENTRIC NETWORKS

CROSS REFERENCE TO RELATED APPLICATIONS

This application is a continuation of U.S. patent application Ser. No. 15/780,433, filed May 31, 2018 which is the U.S. National Stage, under 35 U.S.C. § 371 of International Patent Application No. PCT/US2016/065782, filed Dec. 9, 2016 which claims the benefit of U.S. Provisional Patent Application No. 62/265,178, filed Dec. 9, 2015 the contents of which are hereby incorporated by reference herein.

BACKGROUND

Information-centric networking (ICN) relates to a paradigm in which content is exchanged by means of information addressing, while connecting appropriate networked entities that are suitable to act as a source of information towards the networked entity that requested the content.

SUMMARY

Some embodiments include systems, methods, and devices for enabling communication between at least two internet protocol (IP)-only wireless transmit/receive units (WTRUs), at least one of which is connected to an information centric network (ICN). The WTRU may send a generic attribute registration multicast registration protocol (GMRP) request on a local IP link to an information centric network (ICN) network attachment point (NAP). The NAP may receive and register the GMRP request with an internal database (DB) along with an IP multicast address entry matching the GMRP request. The WTRU may then send an IP multicast packet to the NAP for dissemination to an IP multicast group over an ICN by encapsulating the IP multicast packet in an ICN packet.

BRIEF DESCRIPTION OF THE DRAWINGS

A more detailed understanding may be had from the following description, given by way of example in conjunction with the accompanying drawings wherein.

DETAILED DESCRIPTION

Figure 1A:
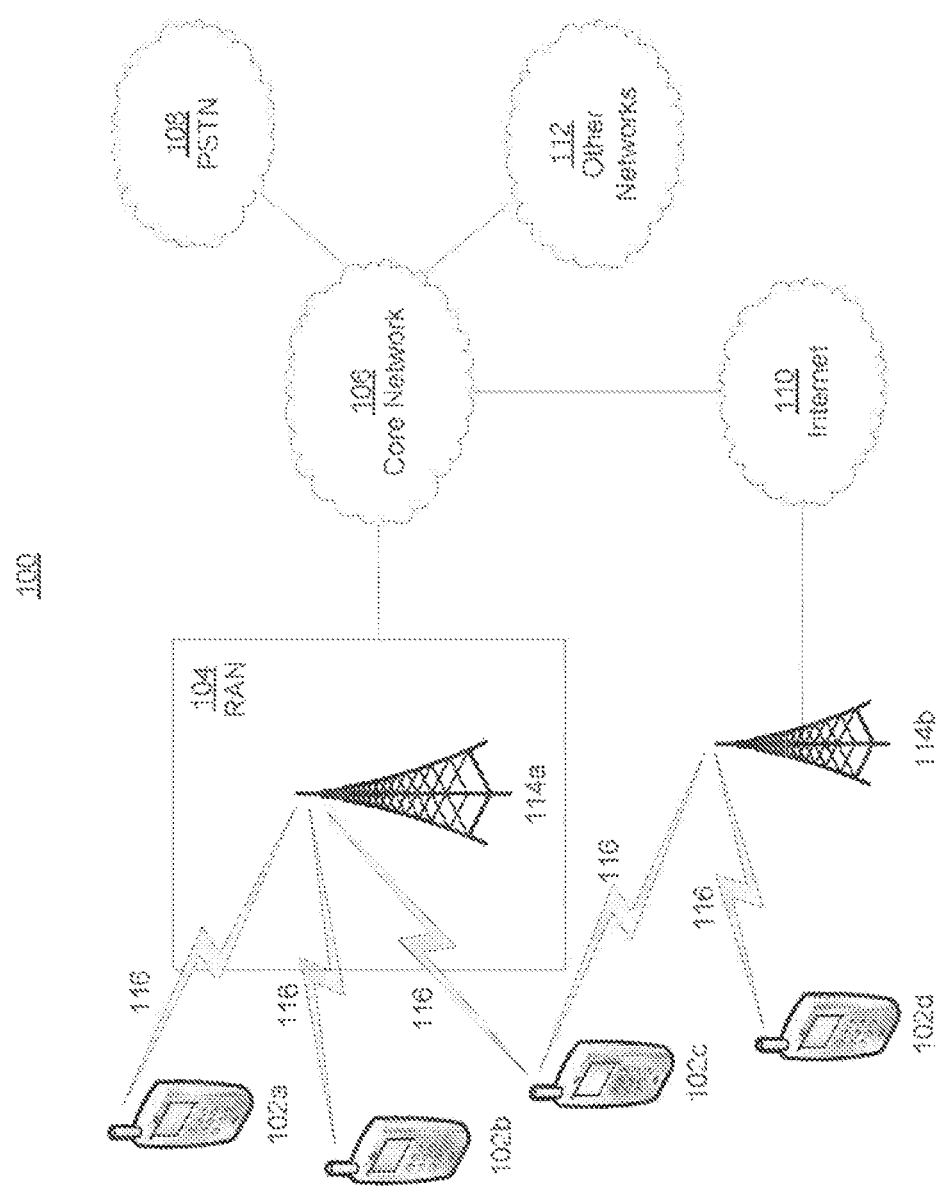
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that, the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a. 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 300 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (JR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000). Interim Standard 95 (IS-95), Interim Standard 850 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing sendees, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRU-s 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
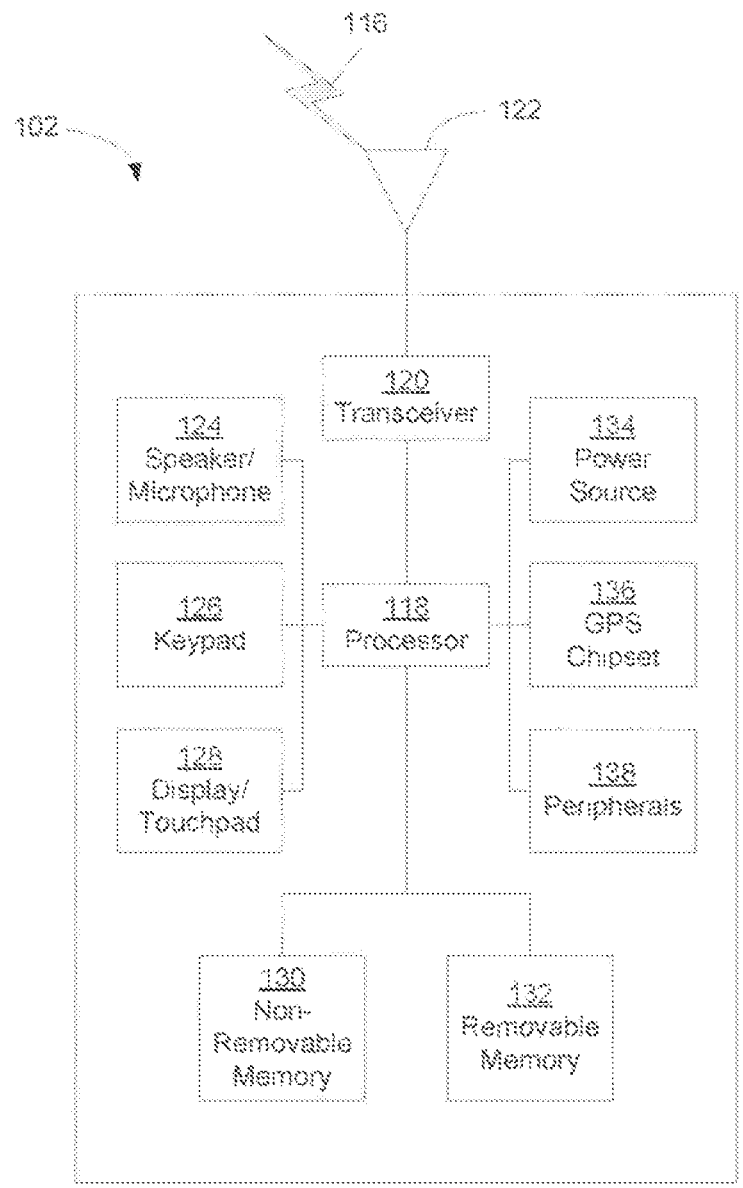
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B the WTRU 102 may include a processor 118, a transceiver 120, a transmit/receive element 122, a speaker/microphone 124, a keypad 126, a display/touchpad 128, non removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs). Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input, data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 110 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
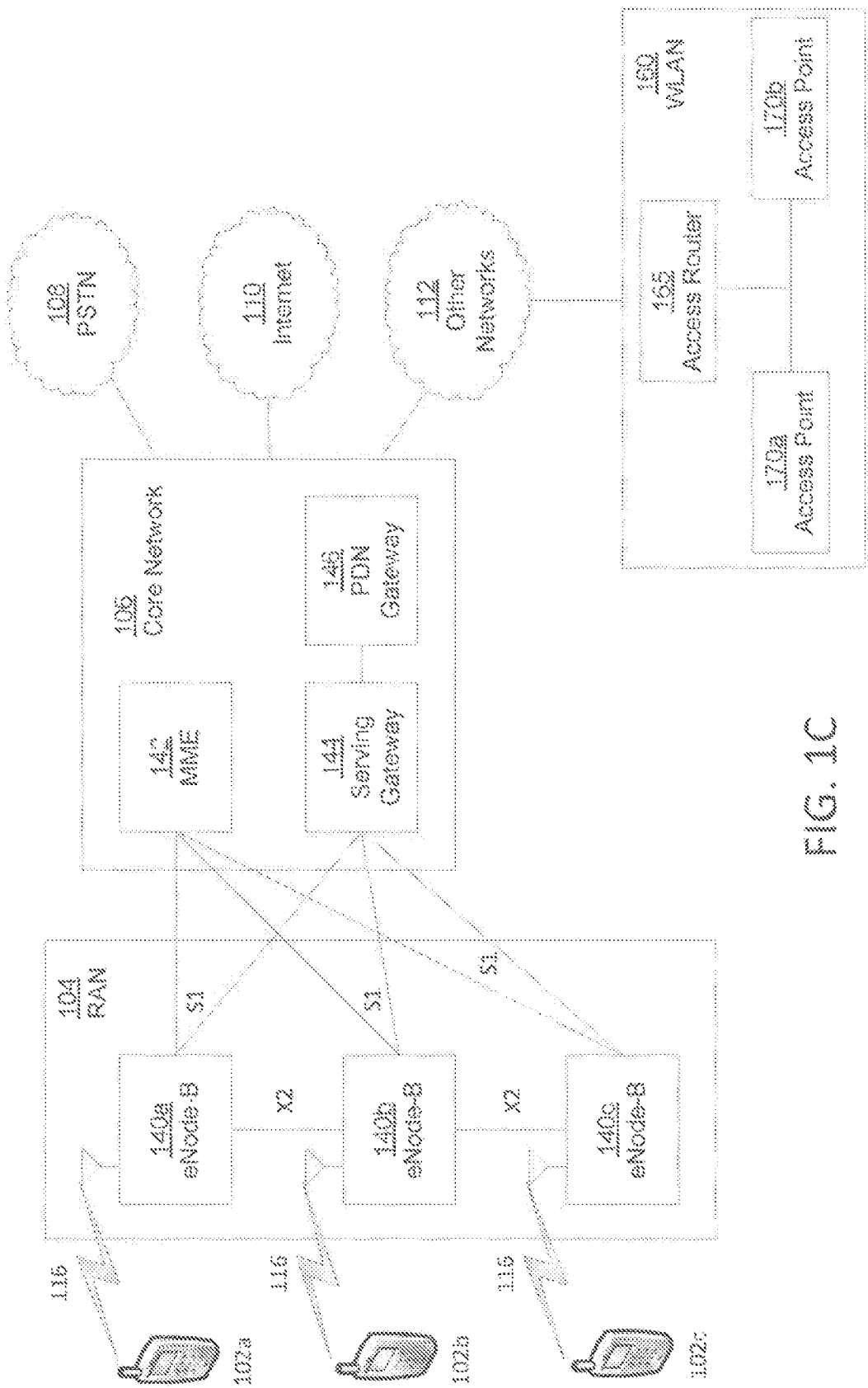
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the ENodeBs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b* 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c* and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 141 may also be connected to the PDN gateway 146, which may provide the WTRUs 102*a*, 102*b*, 102*c* with access to packet switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit switched networks, such as the PSTN 108, to facilitate communications between the WTRUs 102*a*, 102*b*, 102*c* and traditional land line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 70b. The communication between access router 165 and APs 170a, 170b may be via wired Ethernet (IEEE 802.3 standards), or any type of wireless communication protocol. AP 170a is in wireless communication over an air interface with WTRU 102d.

Described herein are various systems, methods and procedures to enable communication as identified through an IP multicast compatible address between at least two IP-only devices, one connected to an information-centric networking (ICN) network while the other one is connected either to an ICN or IP network. Such systems, methods, and procedures may include, for example, methods and procedures for an ICN Network Attachment Point (NAP) to act upon Internet Group Management Protocol (IGMP) requests and responses originating from an IP-only device, via an ICN; methods and procedures for an ICN NAP to act upon multicast reception registration requests and responses originating from an IP-only device, via an ICN; and methods and procedures for an ICN NAP to send and receive IP multicast packets to and from an ICN network.

Various architectures have been proposed in the ICN space which may require the partial replacement of current network infrastructure in order to realize desired network-level functions. Migration scenarios foresee that the new proposed architectures may be realized as an overlay over existing, e.g., IP- or local Ethernet-based, architectures. Such migration, however, may still require the transition of the WTRU to an ICN-based solution. With IP-based applications currently providing a broad range of Internet services, transitioning such applications may be a much harder task than transitioning only the network-level functionality (e.g., protocol stack implementation, in the WTRU), since this transition may also require the transition of server-side components (e.g., e-shopping web-servers and the like). It thus may be assumed that IP-based services, and correspondingly purely IP-based WTRUs, may continue to exist for some time to come.

One subclass of IP-based services includes IP multicast services, where one or more senders sends IP packets to an IP multicast address. These packets may in turn be received by any receiver which has previously subscribed for reception of packets from said IP multicast group. Examples of such IP multicast services may include internet protocol television (IPTV), where a video stream is sent according to a well-known schedule (e.g., based on some television (TV) guide application) and may be received based upon registration for reception of the video stream (e.g., for reception of a TV program). A possible problem in such IP multicast operations in current IP networks relates to the network-internal state in each intermediary IP multicast enabled router. For IPTV use cases, such as those of streaming a catalogue of IP-based sources on channels, channel switching times may present a problem due to router reconfigurations which may be incurred when joining or leaving IP multicast sources.

Various methods, systems, and devices discussed herein may relate to transitioning IP networks towards an ICN mode of operation, and improving on the realization of IP-based services and applications in such an environment. In order to achieve such combination, systems, methods, and devices are described herein where IP based devices may communicate while being attached to an ICN network. The protocol for communication may be IGMP, the control protocol for IP multicast based services (either version 2, 3, or any future version) and IP multicast send/receive operations.

Figure 2:
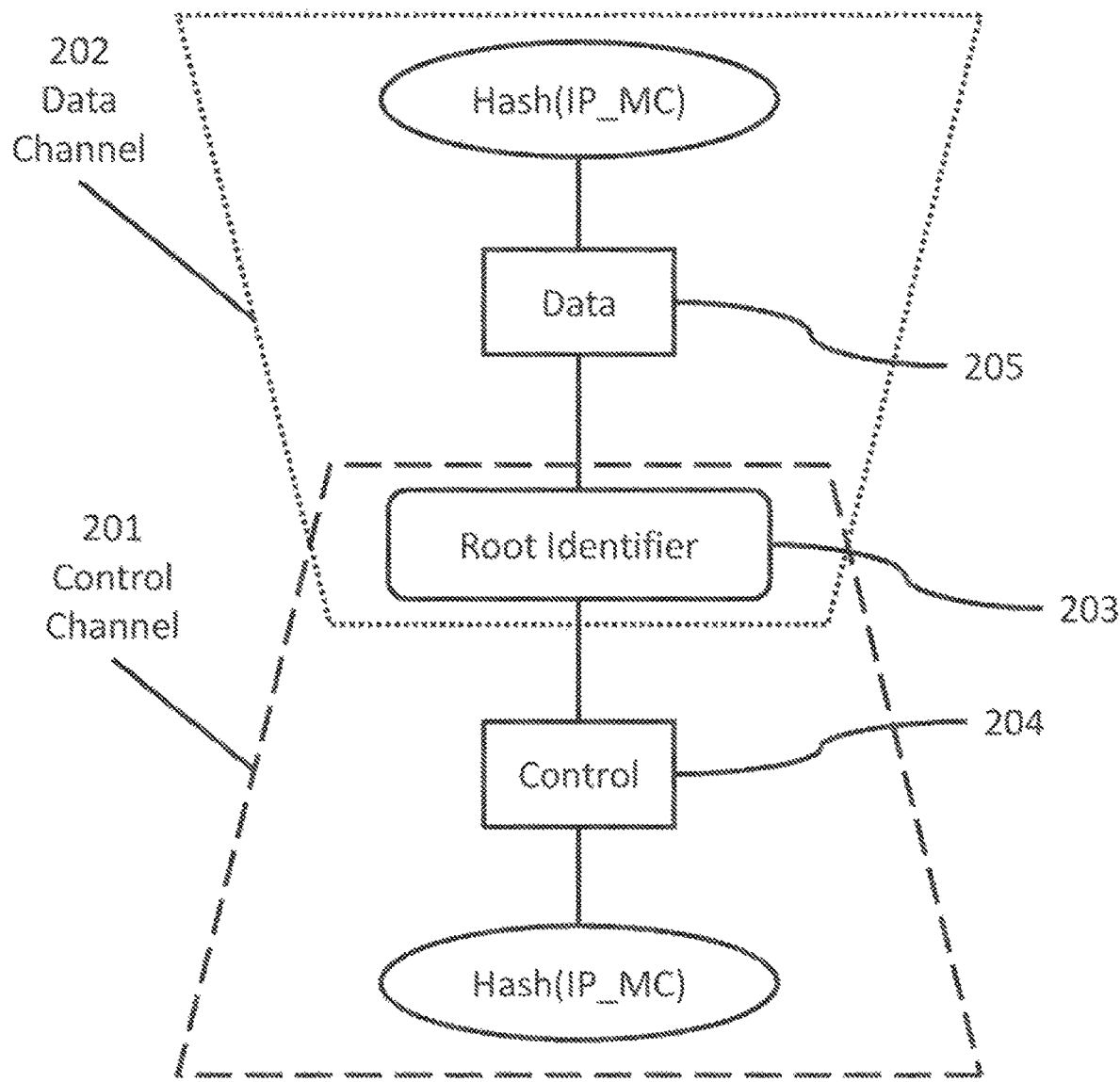
FIG. 2 is an example diagram of an appropriate ICN name space.

FIG. 2 is a diagram which illustrates an example embodiment of the ICN name space, according to the description herein, with a single root identifier 203 for IP multicast using ICN communication, two sub-scope identifiers for the IGMP control 204(C) and IP multicast, data 205(D) channel and flat namespace of control channel 201 and data channel 202 identifiers under each of these sub-scopes.

In the example of FIG. 2, IGMP operations for joining and leaving an IP multicast group may be realized via publications to an appropriate ICN name. Any sender to the IP multicast address may act as a subscriber to the appropriate ICN name. A publication with implicit subscription operation may be used for such publications. In an example case, the implicit subscription may be to the data channel 202 of the IP multicast group, which in turn may be identified as a separate appropriate ICN name. Any sender to the IP multicast group may act as a publisher to the data channel 202 of the IP multicast group; i.e., the actual IP multicast packets, the data 205, may be sent via the data channel 202 of the IP multicast group.

Figure 3A:
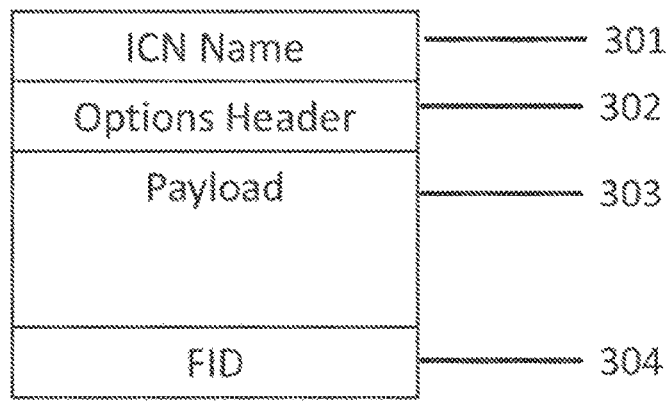
FIGS. 3A and 3B are example packet format diagrams.
Figure 3B:
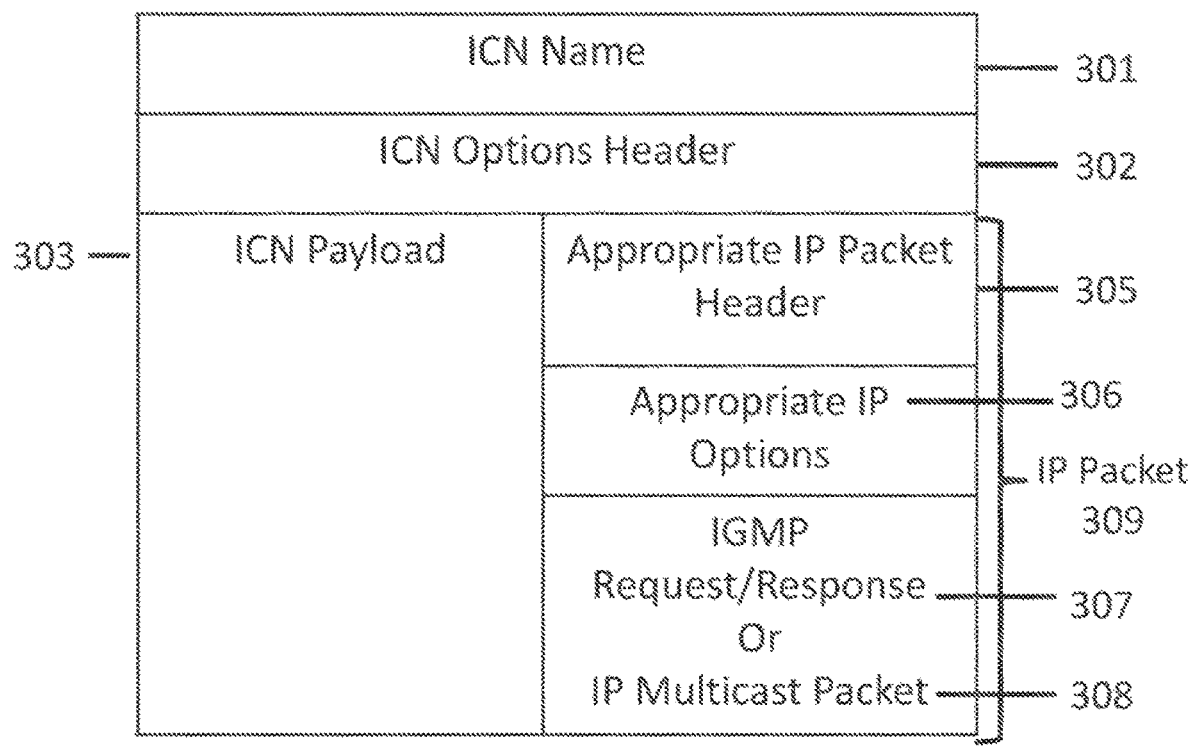

FIGS. 3A and 3B show an example of formatting for the encapsulation of IGMP and IP multicast packets in ICN packets. FIG. 3A shows an example of a generic ICN packet format that may include an ICN name 301, a possible options header 302, and a payload 303. The ICN packet format may also contain any required forwarding information, which would be denoted through an explicit forwarding identifier (FID) 304. Regardless of the example shown in FIG. 3A, the ICN packet format may take any form as necessitated by the system and/or usage requirements. FIG. 3B shows an example of encapsulating an IP packet 309 into an ICN packet, which may consist of the IP packet header 305, the IP options 306 field, and the IGMP request/response 307 or the IP multicast packet 308, copied into the ICN payload 303 of the ICN packet.

Figure 4:
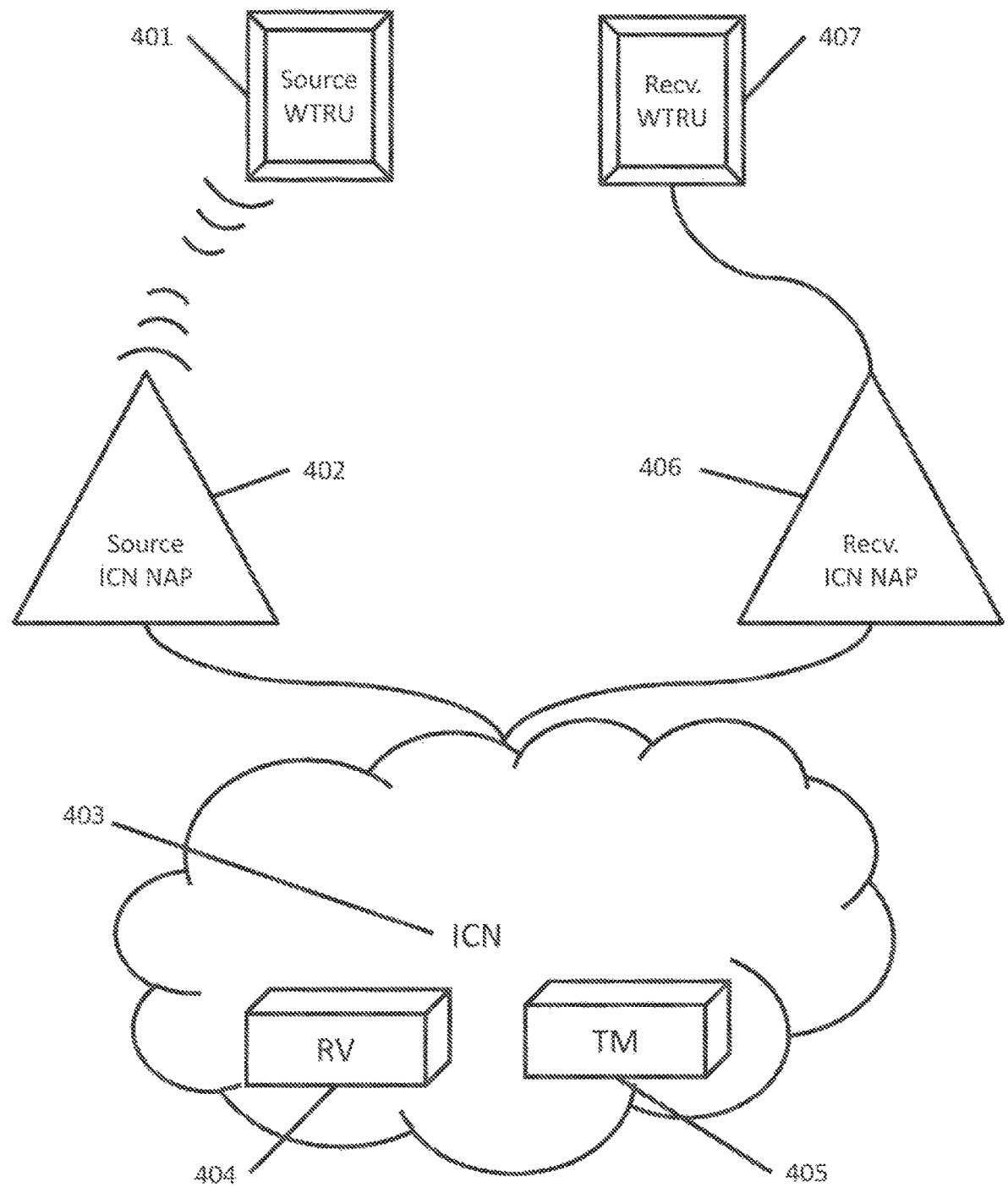
FIG. 4 is an example diagram of an ICN system architecture.

FIG. 4 is an example diagram of an ICN system architecture; the example system for communication within an ICN may include an IP-based WTRU 401, which may execute any standard IP multicast-enabled application and/or service (e.g., by sending and/or receiving IP multicast packets at its network interface) in collaboration with another WTRU 407, the latter located in an ICN network 403. In one embodiment, WTRU 401 may act as the sender and/or source of data and WTRU 407 may act as the receiver of the data sent by WTRU 401.

The example system may also include a number of ICN network access points (NAPs), such as 402 and 406. In one embodiment, NAP 402 may act as the source of data which was, received from the source WTRU 401 and the NAP 406 may act as the receiving NAP which passes the data on to the receiving WTRU 407. The WTRUs may be wired or wireless. The NAPs may be wired or wireless. In FIG. 4, an example embodiment is shown where WTRU 401 may communicates wirelessly with the NAP 402 and WTRU 407 may communicate in a wired manner with NAP 406; the NAPS may then communicate over the ICN via wired connections. The connections shown in FIG. 4 are examples, but any connection between two points may be wired or wireless. The example system may also include a rendezvous (RV) component 404 that may be part of the ICN 403 and responsible for discovering publishers and subscribers of information. The example system may also include a topology management component 405 that may be part of the ICN 403 and responsible for path computation upon request from the RV or NAP component. The example NAP 402 may act as a router towards the WTRU 401.

Figure 5:
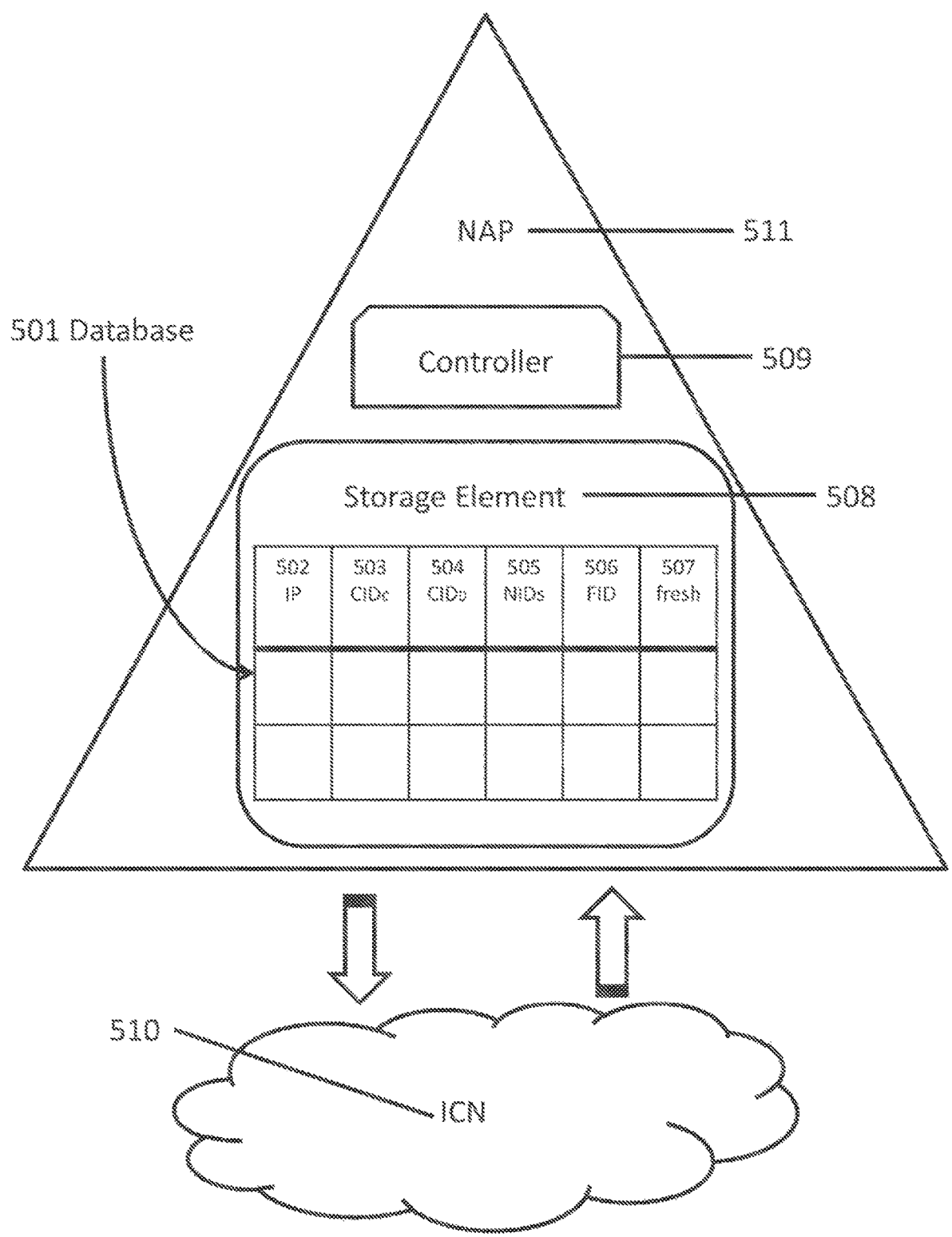
FIG. 5 is an example diagram of an ICN Network Attachment Point (NAP) or ICN border gateway (GW)

FIG. 5 illustrates an example of an ICN Network Attachment Point (NAP) 511 or ICN border gateway (GW) that communicates with an ICN network 510, which may be used interchangeably. In such an example, the NAP 511 may include a request database (DB) 501, which may include columns for the IP multicast address 502 and the appropriate ICN names for the control ($CID_C$) 503 and data ($CID_D$) 504 channels, respectively, as well as node IDs (NIDs) 505 of the multicast group members, the forwarding identifier (FID) 506 to all receiving nodes, and freshness information 507 for said FID. Various example implementation models are further discussed herein.

In one embodiment, the NAP controller 509 may be integrated as a standalone NAP, and may implement an functionality described herein. In an alternative embodiment, the NAP controller 509 and storage element 508 may be provided as an add-on to a standard NAP, e.g., in the form of a software add-on. Depending on the software platform used for the NAP, this add-on may be provided through a downloadable software module and/or may be provided through frameworks such as a Network Virtualization Function (NVF).

In another alternative embodiment not shown, the storage element 508 and look-up functionality (i.e., the mapping of IP multicast addresses onto appropriate ICN names), may be realized in an operator-based central element/hardware/node. Such centralization may be realized for manageability reasons and/or for the IP-ICN name mapping. Further, the NAP controller 509 may utilize remote connectivity over the ICN 510, or other networks, to a storage element of the central element to perform the IP-ICN name mapping.

Figure 6:
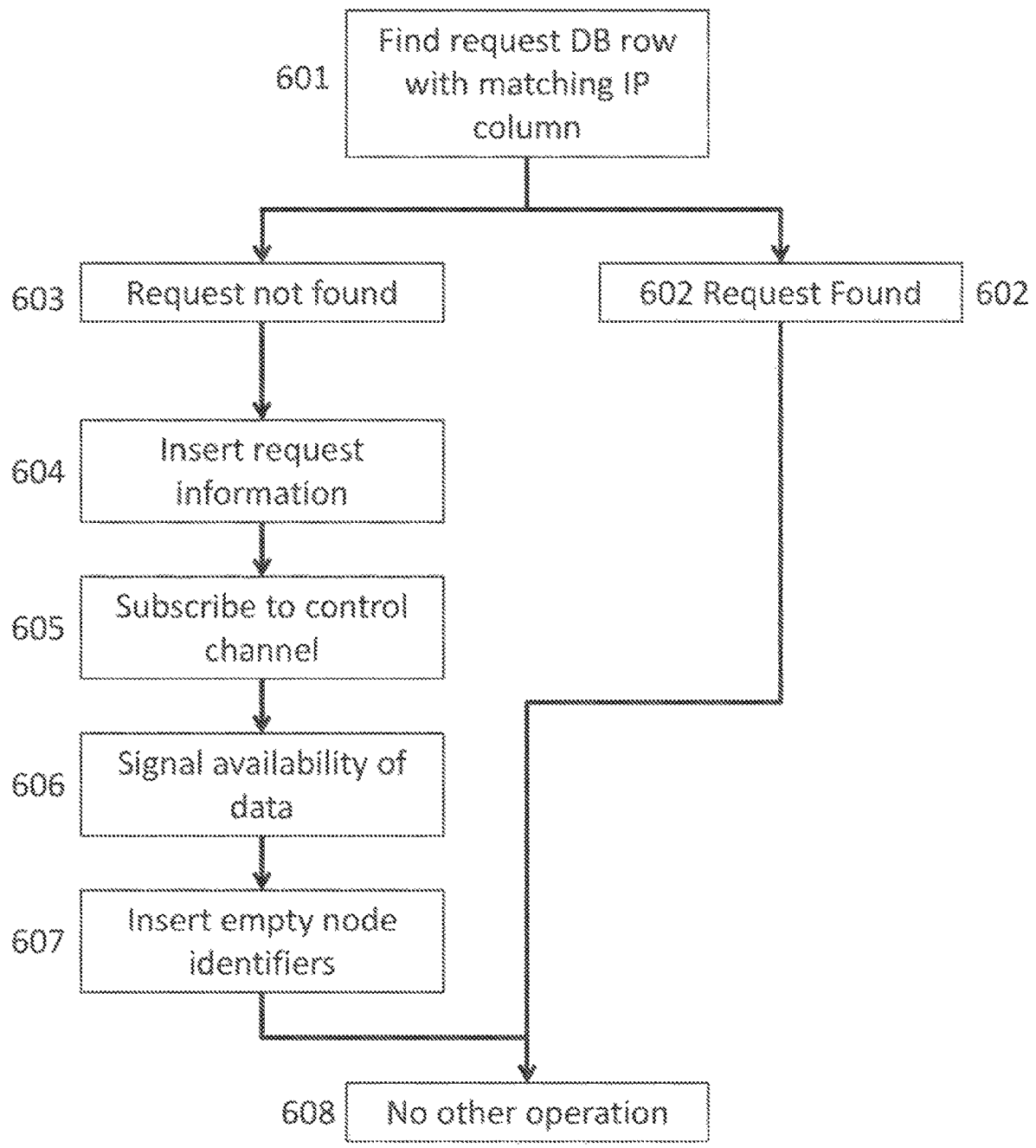
FIG. 6 is a flowchart of an example process of the registration of IP multicast sources.

FIG. 6 shows a flow chart of an example process of the registration of IP multicast sources. In examples as described herein, a source IP-based WTRU 401 may have IP multicast packets for transmission, e.g., as an IPTV server. A desire on the part of the WTRU 401 to send IP multicast packets may be indicated using the generic attribute registration protocol (GARP) multicast registration protocol (GMRP) to register the included multicast address as one being sent by the WTRU 401. Hence, the IP-based WTRU 401 will send a GMRP request on its local IP link, which may in turn be received by the NAP 402. Upon receiving such request, the NAP 402 connected to the WTRU 401 may perform the following operations: 601 search for request DB row with matching IP column 502, said column containing the IP multicast address in the WTRU registration request; 602 if this request DB row is found, perform 608 no other operation; 603 if no IP DB row is found, 604 insert a new row with IP 502 and $CID_D$/$CID_C$ entries 503/504, the $CID_D$/$CID_C$ 503/504 entries formed according to the namespace of FIG. 2 (i.e., by applying an appropriate hash function over the IP multicast address); further, 605 subscribe to the control channel for this IP multicast address, e.g., by subscribing to/root/C/hash($CID_C$); 606 signal the availability of data on the data channel for this IP multicast address, e.g., by publishing to/root/D/hash($CID_D$); and 607 insert an empty set of NIDs in the appropriate NIDs column 505 of the row at which point the operation is complete and any appropriate subsequent operation may be performed or no operation may be performed.

Figure 7:
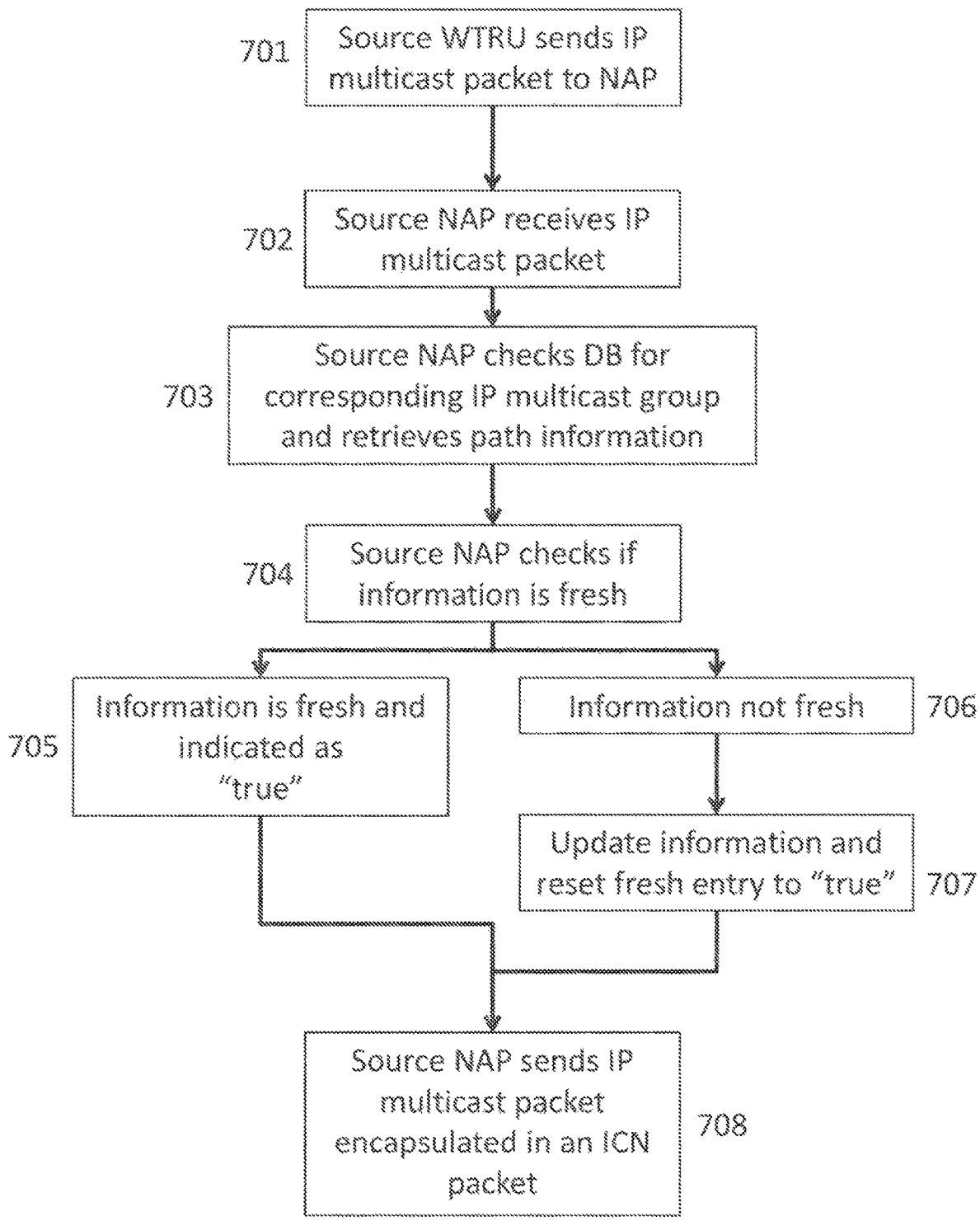
FIG. 7 is a flowchart of an example process of sending data to an IP multicast group.

FIG. 7 shows a flow chart of an example process of sending to an IP multicast group. In continuing the example process of having registered to the IP multicast group as described herein, a source IP-based WTRU 401 may begin sending IP multicast packets to the registered IP multicast group, e.g., by sending 701 an IP multicast packet to its ICN NAP 402. Upon receiving 702 the IP multicast packet, the NAP 402 may check 703 its internal DB 501 for the row corresponding to the appropriate IP multicast group. If the number of NIDs in the appropriate column 505 of the row is non-zero, the NAP 402 may retrieve the path information to the set of NIDs (i.e., the FID column 506). Next the fresh information is checked 704; if the fresh column 507 indicates that the FID column 506 is outdated 706 (e.g., through a false entry), a new FID may be calculated through an update operation 707. In one embodiment, this path information may be represented through so-called Bloom filter (BF) information, where the BF information encodes links along the path from the sender to the receiver. Upon retrieving the individual path information for each NID (i.e., the path from the NAP to the individual NID), the multicast path to all NIDs may be determined by applying an OR operation over all individual BF identifiers. To this end, the DB in the NAP may be extended with another column that holds the FIDs for all NIDs of the appropriate NIDs column. After the update operation 707, the result may be stored in the FID column with the fresh column set to true 705, indicating a valid FID value. After determining the multicast path information, the NAP 402 may send 708 the encapsulated IP multicast packet to the ICN 403, as described above regarding encapsulation, under the $CID_D$ (i.e., the data channel) ICN name, utilizing the FID information from the appropriate row to the ICN. This operation may or may not involve the rendezvous (RV) or topology management (TM) components of the example system shown in FIG. 4 and may or may not directly forward the packet as a source-routed packet with locally determined information.

In another embodiment, a domain-local TM component may be involved, which may perform the necessary path computation. In this embodiment, the NAP 402 may request the path computation from the TM component 405 through sending the list of NIDs to the TM 405 and receiving a FID as a response, which in turn may be stored in the FID column 506 with an updated fresh column 507 (set to true). Such request may however only be sent if the fresh column indicated an outdated FID, e.g., through a false entry. Otherwise, the current FID column entry may be used. In both cases, the packet is forwarded from the NAP 402 into the ICN network 406 with the included FID information.

Figure 8:
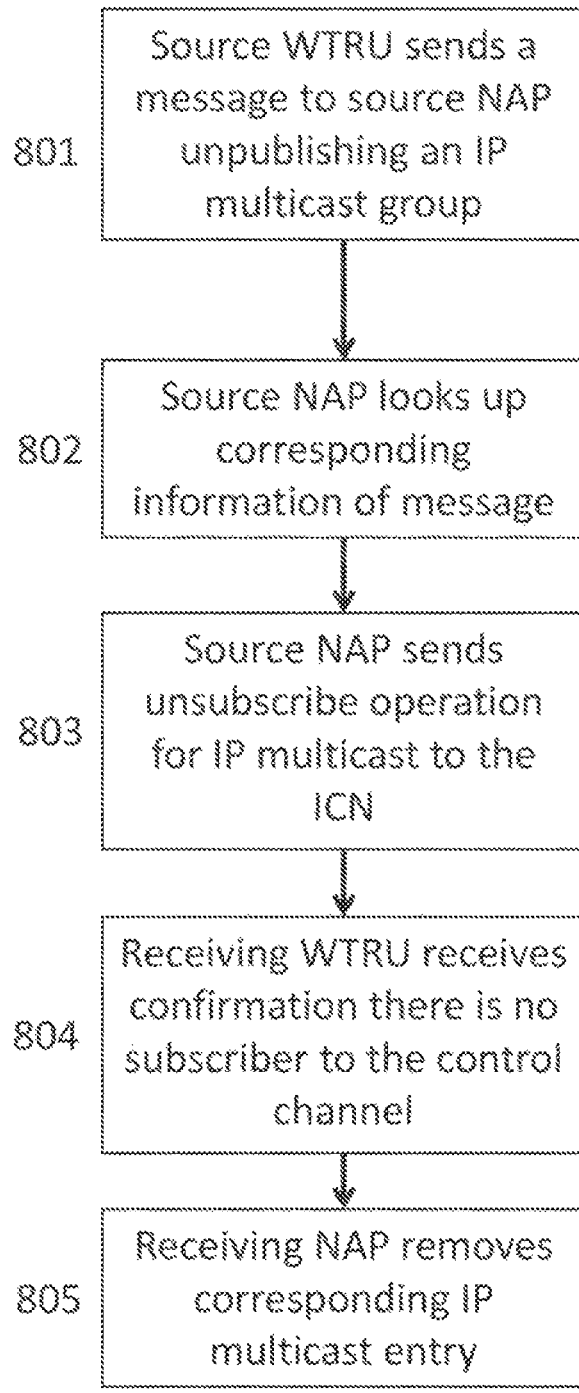
FIG. 8 is a flow-chart of an example process of the unpublishing of an IP multicast group.

In FIG. 8 a flowchart of an example process of the unpublishing of an IP multicast group is shown. The sender to an IP multicast group may decide to unpublish its desire to send data to the group. This may be indicated by an appropriate message to the source NAP 402, such as a GMRP message. The message may be sent 801 by the source of the IP multicast, such as an IP-based WTRU 401. After receipt of the message, the source NAP 402 may look up 802 the corresponding information, such as the appropriate row with the IP multicast address in its internal DB. The source NAP 402 may then send 803 an unsubscribe( ) operation to the ICN 403 with the $CID_D$ name. As a result, the sender/source WTRU 401 may no longer receive any join/leave messages and all receivers, such as receiver WTRU 407, may be notified that the sender has left the group (e.g., since the receivers are acting as publishers to the $CID_C$ name). If the sender was the last sender of the IP multicast group, all receivers may be assumed to receive 804 an appropriate confirmation that no subscriber to the control channel (and therefore no sender to the IP multicast group) is left. As a result, the receivers' NAP 406 may remove 805 the appropriate row from the database where the $CID_C$ name can be found.

Figure 9:
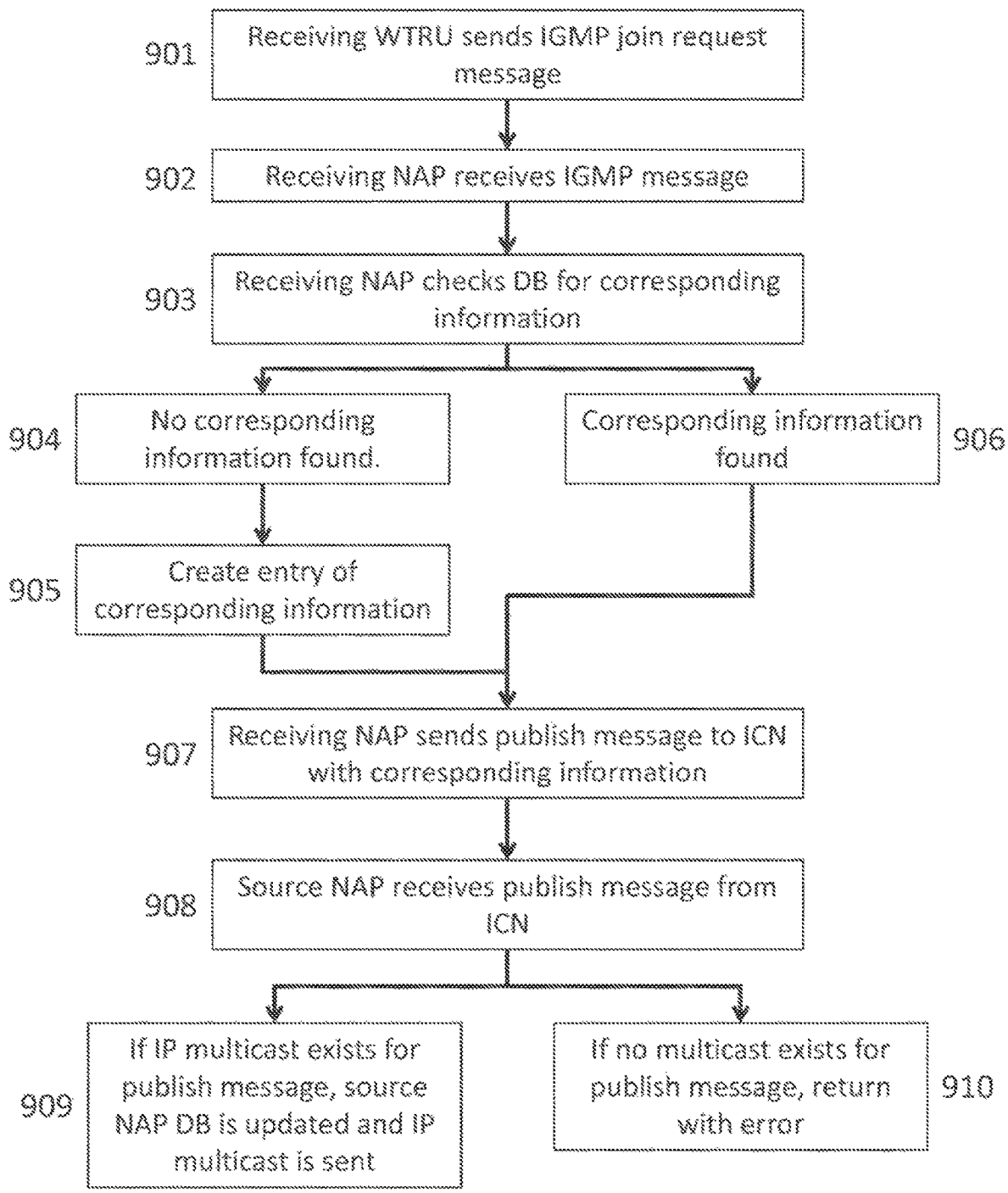
FIG. 9 is a flowchart, of an example process of joining an IP multicast group as a receiver.

FIG. 9 shows a flow chart of an example process of joining an IP multicast group as a receiver. In order for an IP-enabled WTRU to join a specific IP multicast group as a receiver, the receiving WTRU 407 may send 901 an IGMP join request (more specifically, a membership report for the IP multicast address) to its local NAP which acts as the receiving NAP 406 (with the local NAP being its local IP router). Upon receiving 902 the IGMP join request, the NAP 406 may check 903 its internal DB for an appropriate row for the IP multicast address in the join request. If no row is found 904, such row may be created 905 and populated with appropriate $CID_C$ and $CID_D$ entries. Otherwise, the current values for $CID_C$ and $CID_D$ are retrieved 906. The NAP 406 may then send 907 an appropriate message, such as a publish_isub( ) message, for the $CID_C$ name towards the subscribers (i.e., the IP multicast senders). Within such message, the NAP 406 may include its own NID information as well as the IP multicast address it intends to join. Through the inclusion of the NID information, the sending of any IP multicast packet from the sender to the receiver will not involve any operations with the rendezvous component.

Upon receiving 908 such publish_isub( ) message (or other appropriate message) at the source NAP 402 of any IP multicast sender/source, the source NAP 402 will look for an entry in its DB for the provided IP multicast address and then respond 909 with the appropriate IP multicast in an ICN packet as disclosed herein. If no such row is found, an error may be returned 910 (since no sender exists). If the row has been found 909, the NID provided in the publish_isub( ) message may be added to the NIDs column of the appropriate IP multicast address row and the fresh column may be set to false, indicating that the multicast path information will need updating for the next send operation.

Figure 10:
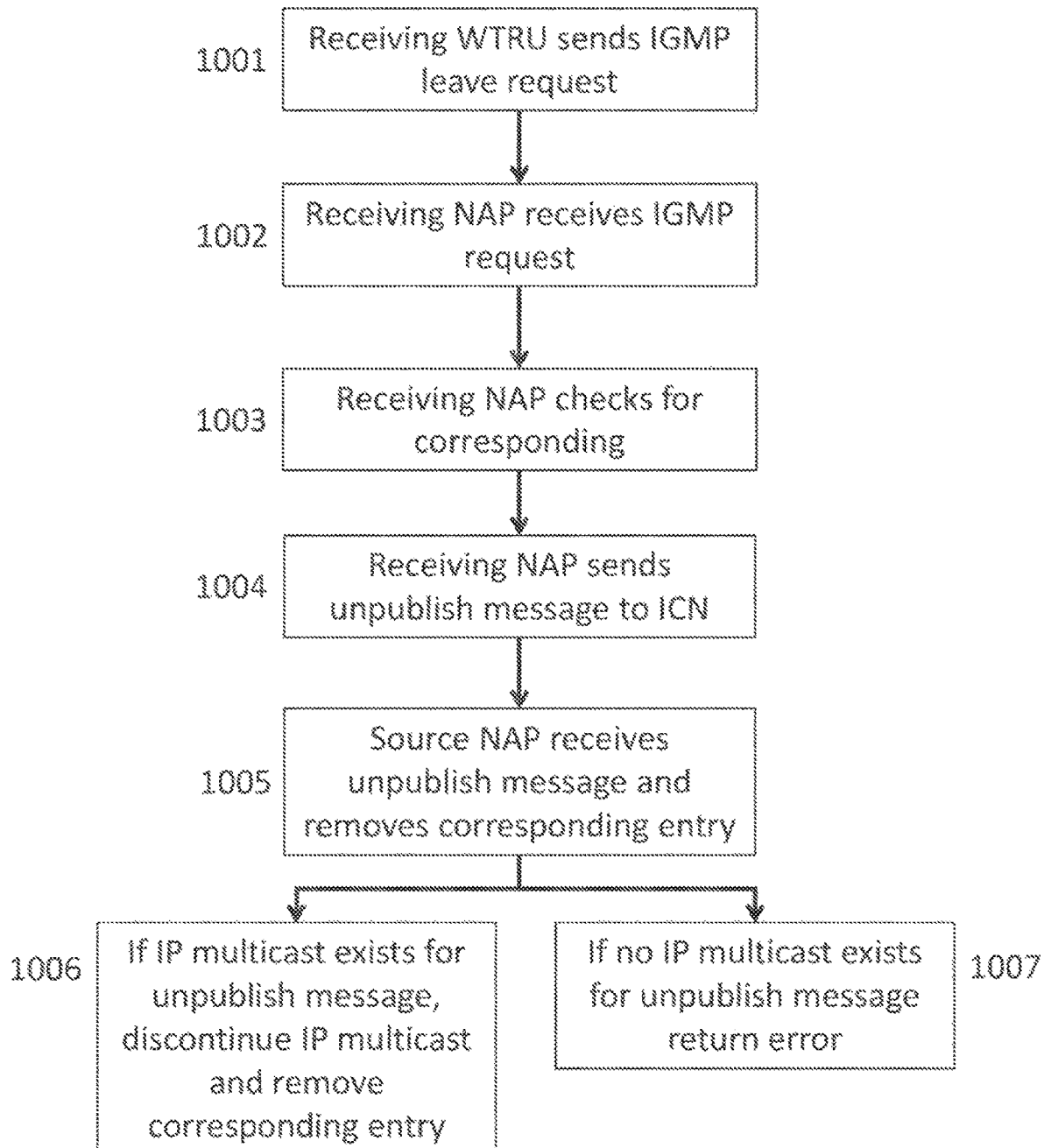
FIG. 10 is a flowchart of an example process of leaving an IP multicast group.

FIG. 10 shows a flowchart of an example process of leaving an IP multicast group. In order for an IP-enabled WTRU that is receiving an IP multicast to leave a specific IP multicast group, said WTRU 107 may send 1001 an IGMP leave request. Upon receiving 1002 such IGMP message, the receiving NAP 406 may check 1003 its internal DB for the appropriate IP multicast address row. If found, the NAP 406 will then send 1001 an unpublish_isub( ) message for the appropriate $CID_C$ name towards the subscribers (i.e., IP multicast senders). Within such message, the NAP 406 may include its own NID information as well as the IP multicast address it intends to leave.

Upon receiving 1005 such unpublish_isub( ) message at the source NAP 402 of any IP multicast sender, the NAP 402 may look for an entry in its DB for the provided IP multicast address. If no such row is found 1007, an error may be returned 1005 (since no sender exists). If the row has been found 1006, the NID provided in the unpublish_isub( ) message may be removed from the NIDs column of the appropriate IP multicast address row and the fresh column may be set to false, indicating that the multicast path information will need updating for the next send operation.

It is noted that through the use of the control channel $CID_C$, the latency for join as well as leave operations may be kept to the client-server delay and therefore may be smaller than in current state-of-the-art solutions which may usually have a 1 s to 2 s switching time. Also, the creation of the new multicast group may take place entirely at the sender (e.g., as described above regarding sending to an IP multicast group) through local operations or interactions with a path computation element.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device for carrying out networking functions in an information centric network (ICN), the device comprising:
   a transceiver;
   a storage element; and
   a processor coupled to the storage element and the transceiver, wherein the processor, storage element, and the transceiver are configured to:
   receive a generic attribute registration protocol multicast registration protocol (GMRP) message, wherein the GMRP message is from a source of an internet protocol (IP) multicast; and
   send an unsubscribe operation over a data channel associated with an address of the IP multicast based on the GMRP message, wherein the unsubscribe operation is sent to a receiving network access point (NAP) of the ICN using information associated with the GMRP message, the information being determined from a first database in the storage element, wherein the first database comprises information relating to IP multicast addresses, ICN names for a control channel ($CID_C$), ICN names for the data channel ($CID_D$), and node identifiers (NIDs) of multicast group members.

2. The device of claim 1, wherein the processor, the storage element, and the transceiver are further configured to search the first database, and on a condition that the search finds information associated with the GMRP message, delete an entry with information associated with the GMRP message in the first database, and unsubscribe to a control channel associated with the IP multicast address.

3. The device of claim 2, wherein the processor, the storage element, and the transceiver are further configured to:
   receive a request to publish a message from the receiving NAP;
   send an IP multicast packet encapsulated in an ICN packet in response to receiving the request to publish the message; and
   update the first database with information related to the request to publish the message.

4. The device of claim 3, wherein the first database further comprises information relating to forwarding identifiers (FIDS) and freshness information.

5. The device of claim 4, wherein the processor, the storage element, and the transceiver are further configured to:
 check the first database for the freshness information relating to the IP multicast packet; and
 on a condition that the freshness information indicates a fresh status is true, encapsulate the IP multicast packet in a new ICN packet, and publish the new ICN packet to the ICN; or
 on a condition that the freshness information indicates the fresh status is not true, update the information relating to the IP multicast packet, reset the fresh status to true, encapsulate the IP multicast packet in a new ICN packet, and publish the new ICN packet to the ICN.

6. The device of claim 1, wherein the processor, the storage element, and the transceiver are further configured to:
 receive an internet group management protocol (IGMP) request;
 check for an entry in a second database of corresponding information of the IGMP; and
 send a request to publish a message to the ICN with the corresponding information of the IGMP.

7. A method implemented by a device for communicating over an information centric network (ICN), the method comprising:
 receiving a generic attribute registration protocol multicast registration protocol (GMRP) message, wherein the GMRP message is from a source of an internet protocol (IP) multicast; and
 sending an unsubscribe operation over a data channel associated with an address of the IP multicast address based on the GMRP message, wherein the unsubscribe operation is sent to a receiving network access point (NAP) of the ICN using information, that is associated with the GMRP message, determined from a first database in the storage element of the device, wherein the first database comprises information relating to IP multicast addresses, ICN names for a control channel ($CID_C$), ICN names for the data channel ($CID_D$), and node identifiers (NIDs) of multicast group members.

8. The method of claim 7, further comprising searching the first database, wherein on a condition that the search finds information associated with the GMRP message, deleting an entry with information associated with the GMRP message in the first database, and unsubscribing to a control channel associated with the IP multicast address.

9. The method of claim 8, further comprising:
 receiving a request to publish a message from the receiving NAP;
 sending the IP multicast packet encapsulated in the ICN packet in response to receiving the request to publish the message; and
 updating the first database with information related to the request to publish the message.

10. The method of claim 9, wherein the first database further comprises information relating to forwarding identifiers (FIDs) and freshness information.

11. The method of claim 10, further comprising:
 checking, by the device, the first database for of the freshness information relating to the IP multicast packet; and
 on a condition that the freshness information indicates that a fresh status is true, encapsulating the IP multicast packet in a new ICN packet, and publishing the new ICN packet to the ICN; or
 on a condition that the freshness information indicates the fresh status is not true, updating the information relating to the IP multicast packet, resetting the fresh status to true, encapsulating the IP multicast packet in a new ICN packet, and publishing the ICN packet to the new ICN.

12. The method of claim 7, further comprising:
 receiving at the device an internet group management protocol (IGMP) request;
 checking, by the device, for an entry in a second database of corresponding information of the IGMP; and
 sending, by the device, a request to publish a message to the ICN with the corresponding information of the IGMP.

* * * * *